US005448490A

United States Patent [19]

Gottlieb et al.

[11] Patent Number: 5,448,490

[45] Date of Patent: Sep. 5, 1995

[54] SYSTEM AND METHOD FOR TWO LEVEL REAL-TIME CONTROL FOR AN INSERTING MACHINE

[75] Inventors: Robert K. Gottlieb, Milford; Clare E. Woodman, Norwalk, both of Conn.

[73] Assignee: Pitney Bowes Inc., Stamford, Conn.

[21] Appl. No.: 36,134

[22] Filed: Mar. 23, 1993

[51] Int. Cl.[6] .................. G06F 15/00; G08B 21/00

[52] U.S. Cl. .................. 364/478; 364/138

[58] Field of Search .................. 364/471, 478, 138, 131

[56] References Cited

U.S. PATENT DOCUMENTS

| | | | |
|---|---|---|---|
| 4,497,040 | 1/1985 | Gomes et al. | 364/900 |
| 4,517,650 | 5/1985 | Gomes et al. | 364/478 |
| 4,525,788 | 6/1985 | Gottlieb et al. | 364/478 |
| 4,527,468 | 7/1985 | Piotroski | 364/146 |
| 4,527,790 | 7/1985 | Piotroski | 270/58 |
| 4,527,791 | 7/1985 | Piotroski | 270/58 |
| 4,547,846 | 10/1985 | Gottlieb | 364/138 |
| 4,547,856 | 10/1985 | Piotroski et al. | 364/478 |
| 4,568,072 | 2/1986 | Piotroski | 270/58 |
| 4,628,478 | 12/1986 | Henderson, Jr. | 364/138 |
| 4,908,770 | 3/1990 | Breault et al. | 364/464.02 |
| 4,910,658 | 3/1990 | Dudash et al. | 364/138 |
| 4,942,535 | 7/1990 | Francisco | 364/478 |
| 5,027,279 | 6/1991 | Gottlieb et al. | 364/478 |
| 5,107,419 | 4/1992 | MacPhail | 395/600 |
| 5,113,222 | 5/1992 | Wilson et al. | 355/209 |
| 5,124,908 | 6/1992 | Broadbent | 364/188 |
| 5,142,482 | 8/1992 | Sansone | 364/478 |

FOREIGN PATENT DOCUMENTS 0404264 12/1990 European Pat. Off. .

*Primary Examiner*—Paul P. Gordon
*Attorney, Agent, or Firm*—Charles R. Malandra, Jr.; Melvin J. Scolnick

[57] ABSTRACT

A method and improved system for controlling an inserter having a plurality of functional devices, including the steps providing a control system that divides the inserter into a plurality of logical stations each of which control at least one of the functional devices, separating the control system into a top-level, generic supervisor which is operative independent of the functional devices, and a lower level comprising the logical stations, and storing the supervisor and the logical stations in a central processor, the supervisor being operative for selecting an appropriate one of the logical stations at an appropriate time whereby the selected one of the logical stations controls a corresponding one of the functional devices. The method further includes the steps of providing a plurality of distributed processors electrically coupled to the central processor and associated with the functional devices, and controlling the functional devices by the logical stations through the distributed processors.

11 Claims, 5 Drawing Sheets

SYSTEM AND METHOD FOR TWO LEVEL REAL-TIME CONTROL FOR AN INSERTING MACHINE

FIELD OF THE INVENTION

The invention disclosed herein relates generally to inserter systems. More particularly, this invention relates to control systems for multi-station inserter systems.

BACKGROUND OF THE INVENTION

Inserter systems, which assemble batches of documents for insertion into envelopes, are known in the art and are generally used by organizations which make large mailings where the contents of each envelope may vary. Large multi-station inserter systems typically include some or all of the following: a plurality of feeder modules for feeding sheets into a batch; a web module for separating webs into discreet sheets and feeding the discrete sheets into the batch; folder modules for folding individual sheets or batches; an envelope module for feeding envelopes into which the batches are to be inserted; a transport system for conveying the batches through the various modules of the inserter system; an insertion module for inserting the batches into envelopes; and meter modules for metering the filled envelopes with appropriate postage. Additionally, multi-station inserter systems may include modules for assembling a collation of sheets fed from a feeder module for further processing, and modules for turning the sheets or envelopes for further processing. A control system is used to synchronize the operation of the various modules in the inserter system to assure that the batches are properly assembled, inserted into envelopes and, possibly, metered, at a high rate.

Although the types of modules used in the inserter system are generally standardized, the configuration of the inserter systems are not. Typically, the multi-station inserter systems are configured to meet a particular application of each customer. Thus, the configuration of such inserter systems varies depending on the customer and the particular application for the inserter system by the customer. In customizing large inserter systems using generally standardized modules the flexibility of the control system to easily adapt to any configuration changes is most important.

In U.S. Pat. No. 4,547,856, issued on Oct. 15, 1985 to Piotroski et al., and assigned to the assignee of the present invention, there is disclosed a universal multi-station document inserter, including a central processor interconnected to a plurality of distributed processors associated with the inserter modules. A supervisory program operating in the central processor controls the modules of the inserter in accordance with instructions programmed into the distributed processors associated therewith. The supervisory program capable of running all the modules of the inserter and performing all control functions is stored in plug-in PROMS which are coupled to the central processor. An additional PROM couple to the central processor includes a data table which specifies a particular inserter configuration and the functions to be performed for that configuration by the executable routines in the supervisory program.

An example of a known method for customizing a multi-station inserter is provided in U.S. Pat. No. 4,497,040, issued Jan. 29, 1985 to Gomes et al., and assigned to the assignee of the present invention.

By using the foregoing format, it was thought that there would be no need to change any of the executable programs in the central processor, and that the same supervisory program could be incorporated into the central processor of each multi-station inserter. This was certainly the case for modules that were known at the time the supervisory program was developed. However, as new modules were developed it became clear that, at least for certain new modules, the supervisory program had to be revised to be capable of running the new modules and performing the control functions for the new module. Such revision to the supervisory program not only required verification of the revised portions but also required a reverification of the entire supervisory program to ensure that the revision had not effected the performance of the supervisory functions.

It is an object of the present invention to provide a supervisory control system that can be more easily adapted to handle new modules in an inserter configuration.

It is a further object of the present invention to provide a supervisory control system that facilitates adding modules that perform new functions in an inserter system.

SUMMARY OF THE INVENTION

In accordance with the present invention, an inserter control system is made up of two levels of processing. The top level of processing is referred to as a "supervisor". The supervisor is a generic part of the control system that can be used on inserter systems of any configuration. The lower level of processing is referred to as a "station". The supervisor controls the inserter as a group of logical stations. Each station is configured for independent handling of collations. The supervisor sends appropriate data and commands to each station for processing a current collation at that station.

Thus, the present invention provides a system and method for controlling an inserter system as a series of independent stations. Each station is configured independently from a data file containing a set of configuration parameters for each station. In addition there is a library of functions which define the processing that occurs at each station. This library of functions may include processing that occurs within a central processor, as well as functions that communicate with distributed processors associated with the various stations.

It has been found that the present invention provides the ability to configure easily an inserter system including new modules being controlled by the control system. It has also been found that the top level supervisor does not need to be revised when a new module is added to the inserter system. Only the lower level station that corresponds to the new module must be verified.

The control system is initialized by reading a configuration file which is preferably stored in permanent storage such as the hard drive of the central processor. The data contained in the file relates to a particular machine that the control system is going to run. All stations and attributes of the stations are fully defined in this file. Stations can be added or deleted through the configuration file. As the configuration file is read into the system, the "image" of the machine is built in data tables located in memory of the central processor. This "image" reflects the number and types of stations defined in the configuration file. New types of stations can be added through the configuration file in conjunction with linking to station file libraries.

The supervisor receives initialization data, which includes the type of station at each position in the inserter system, as well as functions that will be performed at each station while documents are being processed. A global station table includes a record for each station that is configured for the particular inserting machine. Each type of station (such as a feed station, insert station or envelope station) will have its own standard set of parameters that is entered into the table at an appropriate table position corresponding to the location of such station in the inserter system. Additional configuration commands are sent to identify appropriate data paths for communication errors, status messages and collation data.

The supervisor provides a generic method for processing through the global station table which allows the stations to process independently. The table is processed based on real-time input indicating that an "event" has occurred, such as encoder position ticks from the inserter. When the event occurs, an event handler is called, which then calls a table processing function. Each function is called when an appropriate event, such as the encoder tick, has occurred. The supervisor has no knowledge of the actual processing that occurs for each function. All functions return standard values which are used by the supervisor in controlling the overall inserter. These values are handled by the event handler and passed to a function that monitors the running status of the inserter.

The independent functions are passed a station identification (Id) for accessing the configuration data for that station, and a pointer to the data for a collation that is currently located in the station. Using this information, the function can do its processing, independent of the rest of the control system. The station Id is required since the same function can be used several times in a system, for example there may be a plurality of a particular type of feeder module in an inserter. There is a generic function used by each station for passing data to the next station. All data for communications between stations is stored within the collation records that are passed from station to station through the inserter.

The collation data contains all of the dynamic information related to the processing of that particular collation. As a collation pointer is passed through the stations, the data will be updated with the stations information, including scanning data and error codes. Thus, with the stations configuration data, plus the dynamic collation data, stations can process collations independent of the rest of the inserter system.

The supervisor receives a limited set of commands from the user interface. In addition to the configuration commands, the user can command the machine to start and stop. There are also diagnostic commands which can be run. Once the machine has been started, no input is required form the user interface to run the inserter. Periodically, data, such as piece counts, cycle speeds and error conditions, are sent to the user interface for display. When a collation has reached the end of the inserter processing, the data for that collation is sent to the user interface for logging.

Errors are processed according to a configuration definition for each error. The actions available for processing an error are dependent on the modules present in the inserter system. For example, a station may stop the inserter every time an error occurs, after a configurable number of times an error occurs in a row, or a special output handler may be used. The machine code generates error messages when the inserter must stop of operator intervention is required to rectify the problem causing the error.

In accordance with the present invention a method and improved system for controlling an inserter having a plurality of functional devices includes the steps providing a control system that divides the inserter into a plurality of logical stations each of which control at least one of the functional devices, separating the control system into a top-level, generic supervisor which is operative independent of the functional devices, and a lower level comprising the logical stations, and storing the supervisor and the logical stations in a central processor, the supervisor being operative for selecting an appropriate one of the logical stations at an appropriate time whereby the selected one of the logical stations controls a corresponding one of the functional devices. The method further includes the steps of providing a plurality of distributed processors electrically coupled to the central processor and associated with the functional devices, and controlling the functional devices by the logical stations through the distributed processors.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
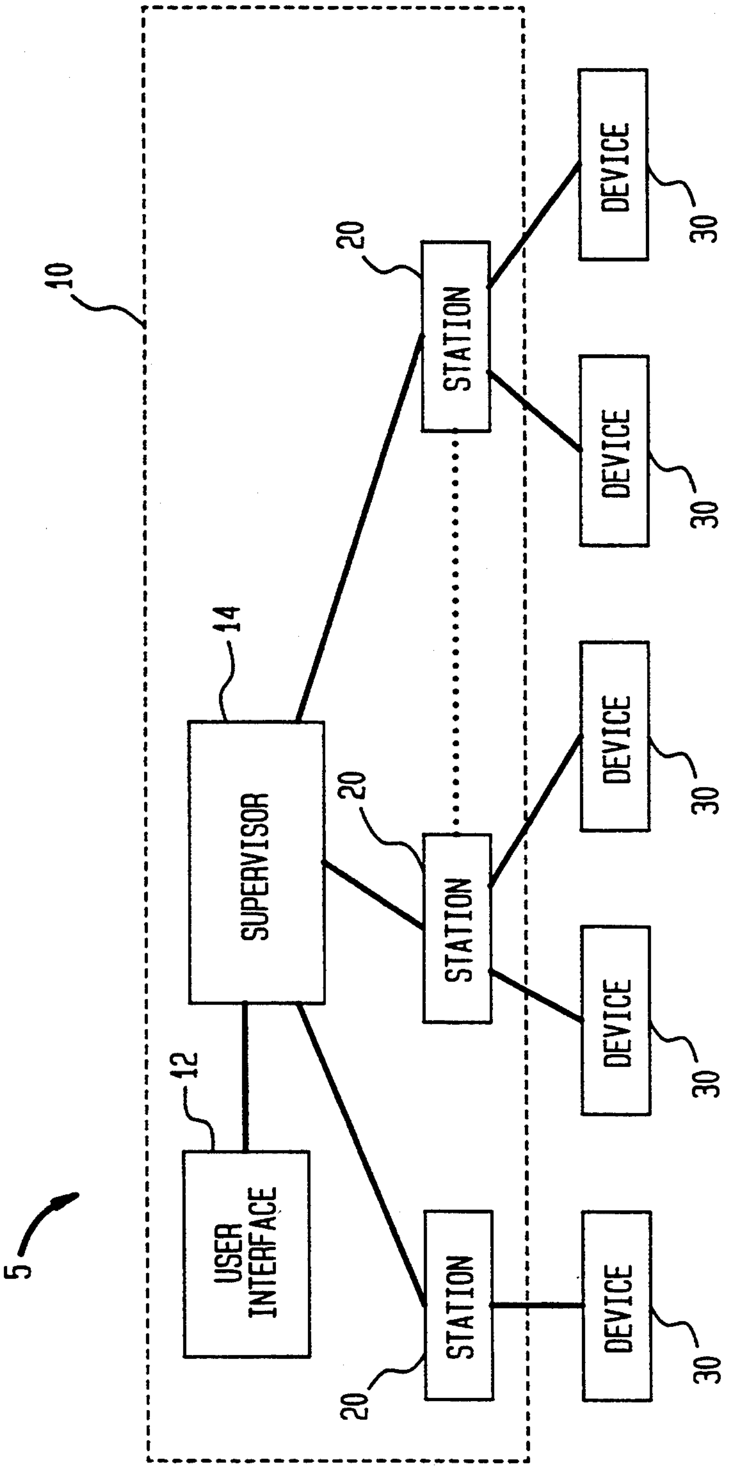
FIG. 1 is a block diagram of a two level machine control system architecture for an inserting machine in accordance with the present invention.

In describing the present invention, reference is made to the drawings, wherein there is seen in FIG. 1 a diagram of a machine control system in accordance with the present invention. A detailed description of a multistation inserter system including a control system comprising a central processor and distributed processors is provided in U.S. Pat. No. 4,547,856 issued Oct. 15, 1985 to Piotroski et al., and assigned to the assignee of the present invention, which is hereby incorporated by reference.

The inserting machine 5 is made up of stations which contain one or more devices. All interaction with machine control system 10 is through a user interface 12. In addition to sending signals input by an operator, user interface 12 also sends data, such as configuration data, based on inputs by the operator.

Device 30 represents a physical device in the machine that performs a function which a station 20 can control. Examples of such physical devices in an inserting machine are a feeder and an optical scanner. Station 20 is a logical device that to corresponds to one or more devices 30 that cannot be access separately. An example of a device 30 corresponding to station 20 is a feeder module comprising a feeder and an optical scanner as Devices. The supervisor 14 represents a generic high level section of the machine control system 10 that is independent of the devices 30 that make up the machine. Stations 20 represent a lower level section of the machine control system 10 that provides the direct control of the devices 30. Supervisor 14 commands and coordinates the interactions among the stations 20.

Figure 2:
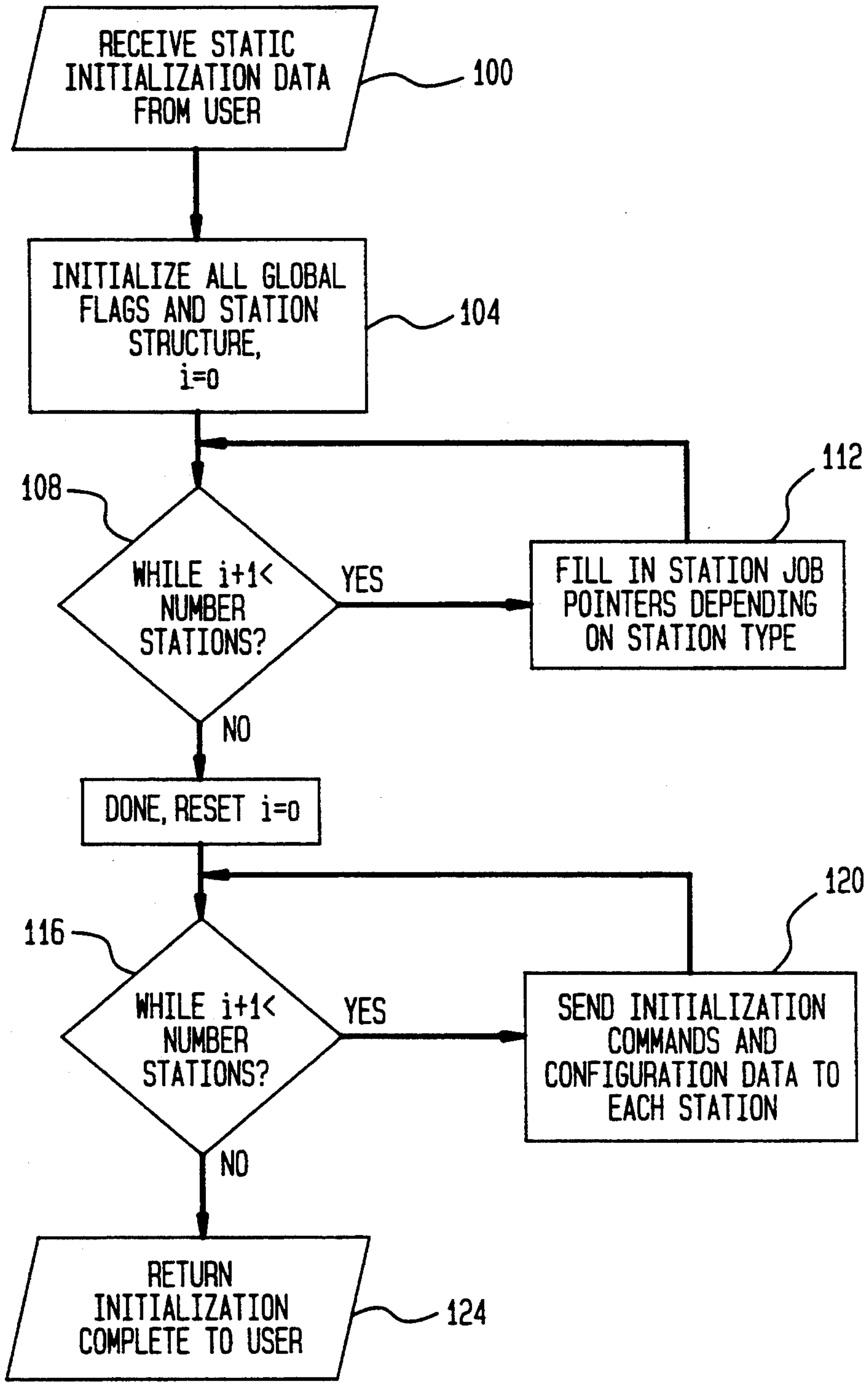
FIG. 2 is a flow chart of an initialization of the high level section of the machine control system of FIG. 1.

Referring now to FIG. 2, the initialization of supervisor 14 is shown. At step 100, supervisor 14 receives static initialization data from the user interface 12. At 104, supervisor 14 initializes all global flags and table of each station 20.

The station 20 table includes station records which contain complete information for each station 20 in the machine. For example, a station records include static station data, such as, station type, scanner configuration and feed count, that relates to the devices 30 controlled by the station 20. Further, each station record includes pointers to a list of functions that are performed by the devices 30 controlled by the station and a list of when to perform the functions. Finally, each station record includes collation data pointers when a collation is in the realm of the device 30 controlled by the station 20. Each station has access only to the collation within the realm of that station.

At 108 and 112, supervisor 14 initializes station job pointers. Each station may include a unique set of jobs which correspond to the station types, such as, feeder, folder, etc. However, each station 20 must include a send-to-next-station function that passes a collation to the next station 20. Each job includes the same parameters: station Id, collation pointer and encoder tick, which determines when the job is performed.

At 116 and 120, supervisor 14 initializes commands and configuration data to each station 20. At 124, supervisor 14 returns an initialization complete signal to user interface 12, indicating that supervisor 14 is ready to respond to operating commands from user interface 12.

In accordance with the present invention the inserter control system can handle any type of interface between the stations 20 and devices 30. In fact, the control system can control a machine including different interfaces to different devices 30. This is possible because for each station, the station table includes station records that contain complete information for every station in the machine. Since each station is a unique set of jobs using different interfaces for various stations is possible because a routine for an interface is encapsulated in the station as one of the jobs for that station. Thus, in accordance with the present invention the routines for the interface(s) reside in the lower level of the machine control system. In previous inserter control systems the interface routines are part of the control system, such as in the PROMS of the control system in U.S. Pat. No. 4,547,856, noted above.

Figure 3:
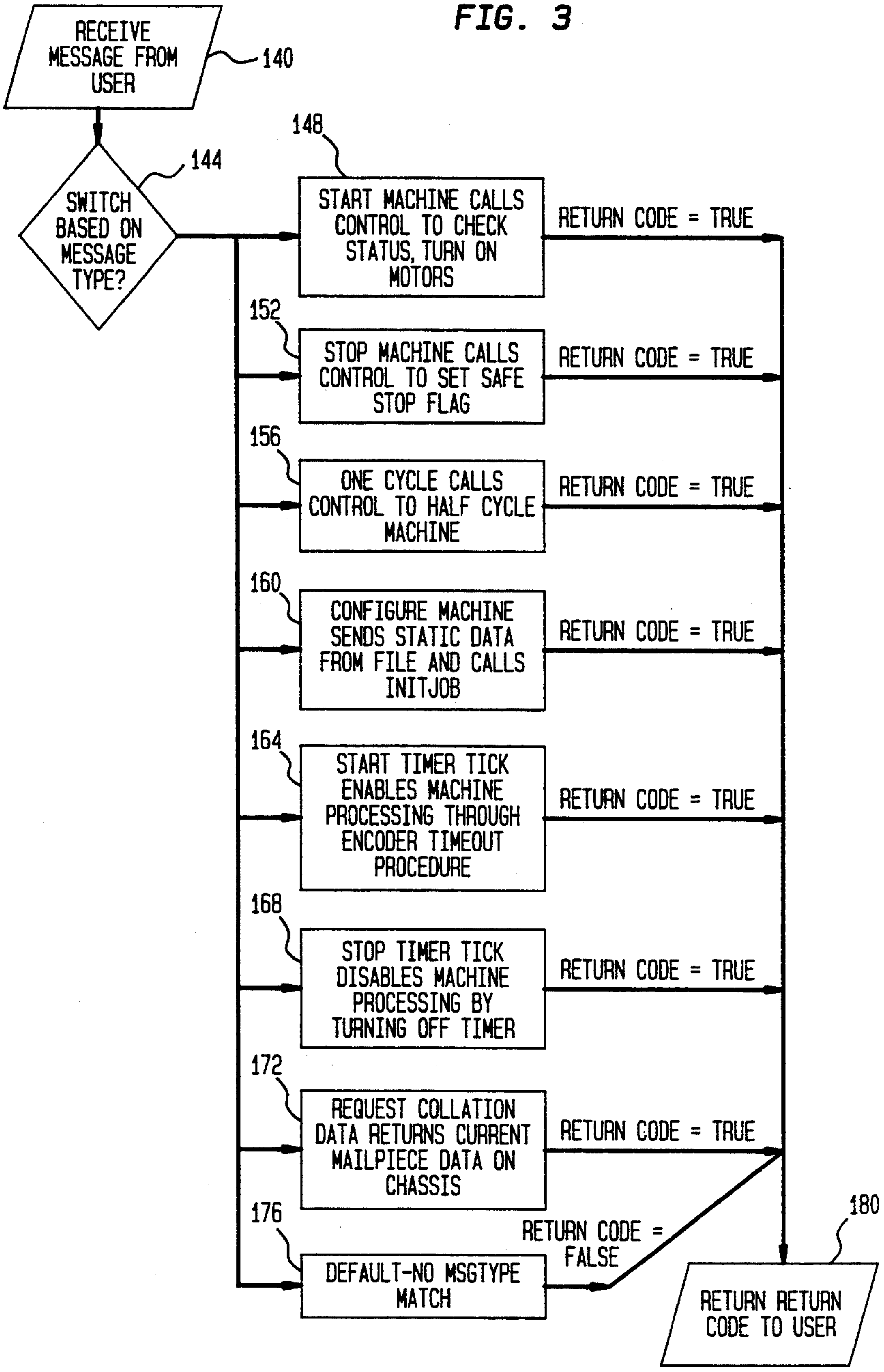
FIG. 3 is a flow chart of a message handler for a user interface to the machine control system.

Referring now to FIG. 3, supervisor 14 processes operating command messages received from user interface 12. At 140, a message is received from user interface 12. At 144, supervisor 14 determines the type of message received and directs the message to an appropriate routine at 148 through 172 accordingly. At the completion of the appropriate routine a true signal is returned to the user interface at 180. If supervisor 14 is unable to match the received message to one of the routines 148–172, then a false code is returned to user interface 12 at 176, 180. Supervisor 14 processes operator initiated messages to control the machine: start machine at 148, stop machine at 152 and one cycle at 156. At 160, a configure machine message calls the initialization routine shown in FIG. 2.

Figure 4:
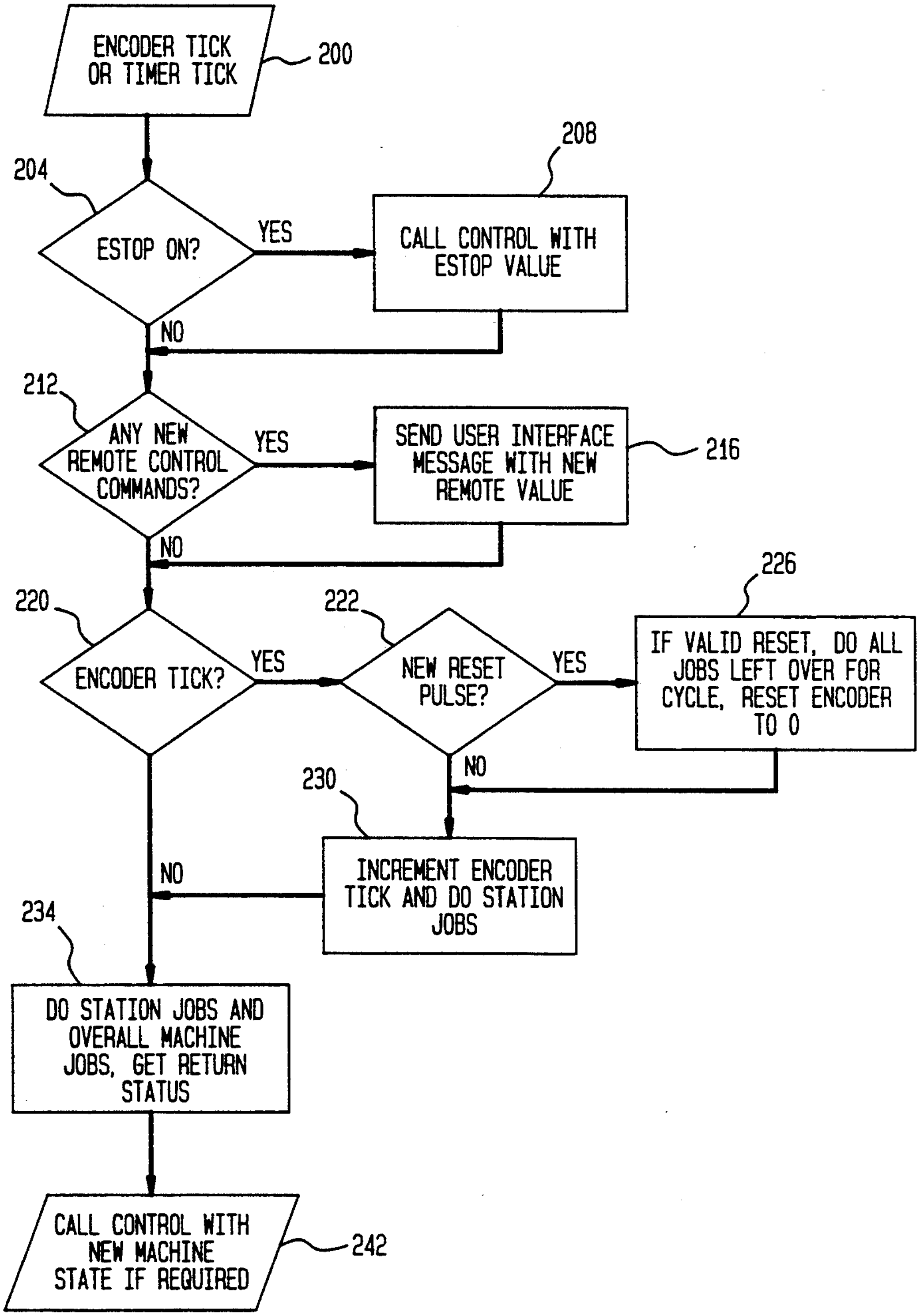
FIG. 4 is a block diagram of an event handler for the machine control system.

Referring now to FIG. 4, a machine event handler of supervisor 14 is shown. The machine event handler is the main processing routine of supervisor 14. At 200, an interrupt from an encoder tick or a timer tick begins the machine event handler. In the preferred embodiment of the present invention encoder ticks create interrupts at a rate of 100 per machine cycle. At 204 and 208, the machine event handler checks for emergency stop. At 212 and 216, the machine event handler checks for a remote control command and sends the user interface a message corresponding to the remote command. If the machine event handler has been called from an interrupt for an encoder tick, and there is no new reset pulse, then at 230, the encoder tick is incremented. If there is a valid reset pulse, then at 226, the machine event handler calls all station jobs remaining for the machine cycle and resets the encoder to zero. At 234, the machine event handler calls the station jobs and overall machine jobs and gets a return status for each job performed. At 242, a new machine state of stop or delay is initiated if required. An encoder timer interrupt occurs every 20 millisecond when the machine is in delay or stop as long as a stop timer tick has not been set.

Figure 5:
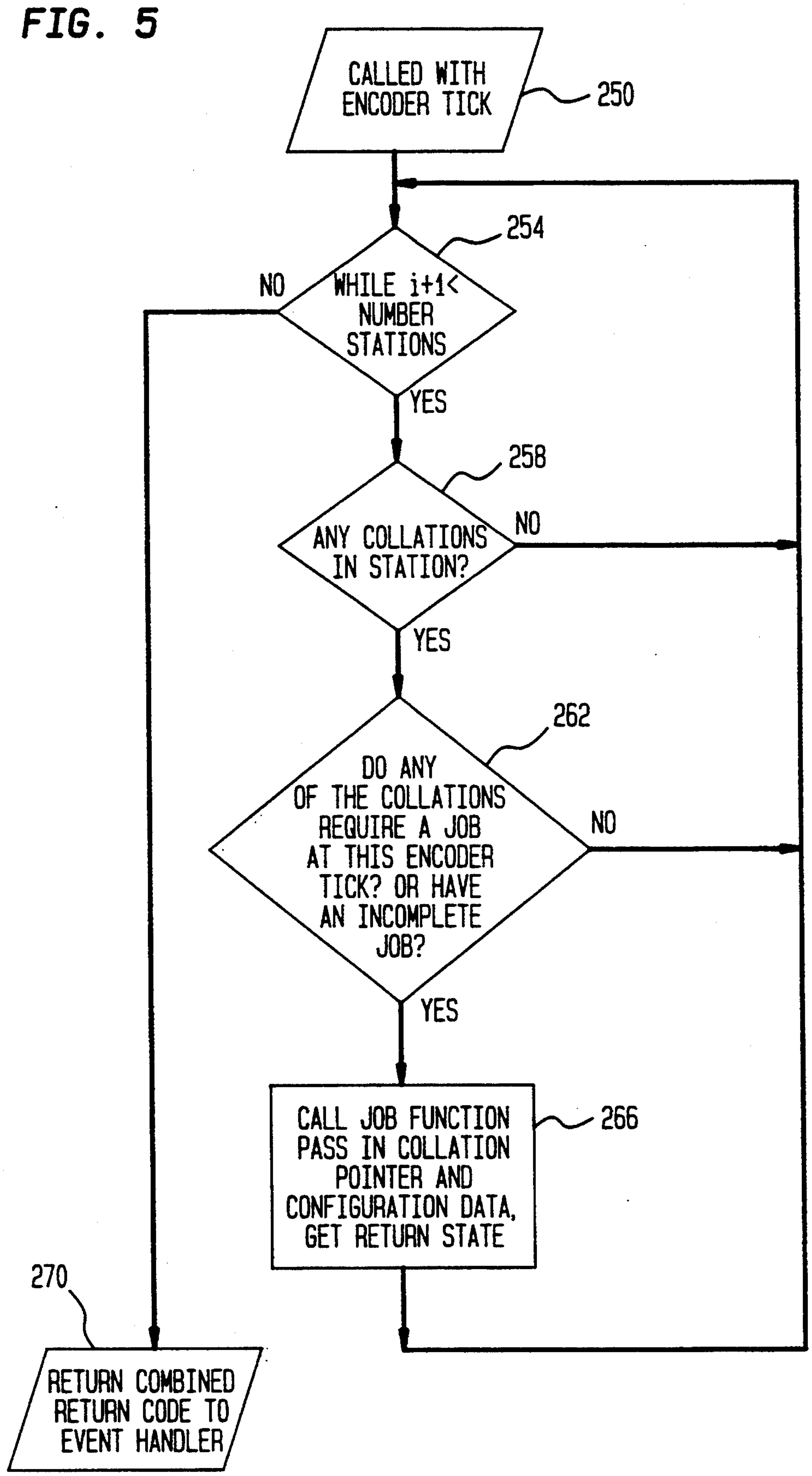
FIG. 5 is a block diagram of a job table processing loop for the machine control system.

Referring now to FIG. 5, a job table processing routine is called by the machine event handler in FIG. 4 with an encoder tick interrupt, at 250. At 254, for each station the current encoder tick is compared with the station's job encoder tick. If the current encoder tick is the same or greater than the station's job encoder tick the job may be performed. At 258, there is a check for a collation at station. If no collation is present at the station, the routine returns to 254 for the next station. If a collation is present, at 262, the collation record is checked to determine if the collation requires a job at this encoder tick, or if a previous job remains incomplete. At 266, the job function is called, the collation pointer is passed to the next station. After all stations have been checked, the routine returns to the machine event handler at 270.

In accordance with the present invention there is one station record for each station. It is noted that a station in the software is not necessarily a station as perceived in the hardware. For example, the turntable area may not be a "station" in the inserting machine, but the turntable job for the station controlling the turntable is a collection of functions specific to the turntable.

In the preferred embodiment of the present invention the machine control system can be updated through the operating system whereby station functions can be dynamically linked to the system. For example, a station can be defined to do functions x, y and z even though the supervisor does not know what x, y and z are. When the jobs are loaded into the machine control system, the unique set of jobs for the station include what x, y and z are and when they each occur. Thus, the functions are dynamically linked into the station table and station records. If there is a change in how a particular station feeds, the feed function for that station can be change dynamically without effecting the functions of the other stations. This dynamic link functionality has been in existence for a while, however, in the present invention it is part of a real time control system for an inserter.

In operation, when the inserting machine is turned on a job, such as job A1, is selected by an operator. Job A1 may include functions x, y and z for a device 30*a* that is controlled by a station 20*a*. (The "a" designation is used to show a particular device and station.) Software routines for functions x, y and z are downloaded into the memory that relates to station 20*a*. The data tables for job A1 tell the supervisor 14 what functions x, y, z are.

If device 30 a is a new type of device that is being added to an existing machine, functions x, y, z are added to the dynamic link library of the machine control system. The supervisor 14 knows through the configuration table that a new station 20*a* has been added and that station 20*a* is to execute functions x, y and z. But supervisor 14 does not know what functions x, y and z do. Supervisor 14 only knows that when it is time to do something at station 20*a* functions x, y or z must be called. If new functions a, b and c must later replace functions x, y, z for the station 20*a*, or a new device with functions a, b and c is to be added, then functions a, b and c have to be added to the dynamic link library. Thus, when a new device is developed it can be added to the inserting machine and controlled by the control system without supervisor 14 knowing what hardware, i.e. type of device, it is controlling. This is a direct benefit to a manufacturer of the inserting system because a new device can be added to the machine without any change to the top level supervisor 14. Heretofore, PROM-based configurations, such as in U.S. Pat. No. 4,547,856, have been hard coded in the PROM. Although an operator could override the hard code on a temporary basis in memory, the operator would have to know what functions must be performed to know how to override the hard code. However, in accordance with the present invention once the possible jobs are saved defined and stored, then any of the jobs can be selected and the machine is automatically configured for that job without any further effort by the operator.

Functions x, y and z actually control the device, however, supervisor 14 only knows when to call x, y or z. For example, if device 30*a* is a feeder, x may be feed, y may be read and z may be pause. For one customer, x, y and z are functions for station 20*a*. However for another customer, station 20*a* may be only performing functions x and z. Through dynamic linking, nothing has to be done to the machine to change from the first customer's configuration to the second customer's configuration. In the past, any change in configuration would have required a change to the configuration programmed in a configuration PROM. Thus, the present invention provides an direct benefit to operators of the inserting machine by eliminating such a rigid requirement.

While the present invention has been disclosed and described with reference to a single embodiment thereof, it will be apparent, as noted above that variations and modifications may be made therein. It is also noted that the present invention is independent of the machine being controlled, and is not limited to the control of inserting machines. It is, thus, intended in the following claims to cover each variation and modification that falls within the true spirit and scope of the present invention.

What is claimed is:

1. In a document inserter including a plurality of functional devices and distributed processor means operatively coupled to each of the functional devices, and central processing means connected to the distributed processor means and having stored therein a supervisory program capable of real-time control of all the functional devices, an improvement to the supervisory program comprising:

a top level of processing comprising a supervisor which generically controls the inserter as a group of independent functional devices; and a lower level of processing comprising a plurality of logical stations that are operatively controlled by said supervisor, each of said stations interfacing with one of the distributed processor means for controlling at least one of the functional devices, wherein each of said stations include a station record containing complete information for the functional devices being controlled thereby.

2. The improvement of claim 1, wherein said station record includes station configuration data, pointers to device functions that are performed by the functional devices and an instant when to perform said device functions, and collation data pointers when a collation is at a functional device controlled by the station.

3. The improvement of claim 2 wherein a user interface sends said configuration data to said supervisor reflecting configuration of the inserter as selected by an operator, said supervisor initializing said stations in accordance with said configuration data.

4. The improvement of claim 3 wherein said supervisor includes a machine event handler that operates on an interrupt basis, said machine event handler calling a particular station to perform a specific one of said device functions based on an interrupt count.

5. The improvement of claim 4 wherein each of said stations send a specific functional signal to an associated functional device at the appropriate time based on the interrupt count matching said instant when to perform said device functions.

6. A method of improved supervisory control of an inserting system including a plurality of functional devices, comprising the steps of:

providing a central processor;

providing a software control system that divides the inserting system into a plurality of logical stations each of which control at least one of the functional devices;

separating the software control system into a top-level, generic supervisor program which is operative independent of the functional devices, and a lower level comprising said logical stations; and storing said supervisor program and said logical stations in the central processor, said supervisor program being operative for selecting an appropriate one of said logical stations at an appropriate time whereby said selected one of said logical stations controls a corresponding one of said functional devices.

7. The method of claim 6, comprising the further steps:

providing a plurality of distributed processors electrically coupled to the central processor and associated with said functional devices, said logical stations controlling said functional devices through said distributed processors.

8. The method of claim 6, comprising the further steps of:

providing configuration data to said supervisor program through a user interface reflecting a configuration of the inserter; and initializing said logical stations in accordance with said configuration data.

9. The method of claim 8, comprising the further steps of:

providing a station record for each of said logical stations in the central processor; and initializing each of said station records with respective station configuration data and pointers to device functions that are performed by the functional devices controlled by the respective logical station.

10. The method of claim 9, comprising the further step of:

keeping track of collations being process in the inserter by collation pointers in said station records.

11. The method of claim 10, comprising the further step of:

calling a particular one of said logical stations at the instant specified in a corresponding one of said station records; and providing control signals from said particular logical station to a corresponding functional device.

* * * * *